I. Van Kersen,
Stump Elevator.
No. 48,748. Patented July 11, 1865.
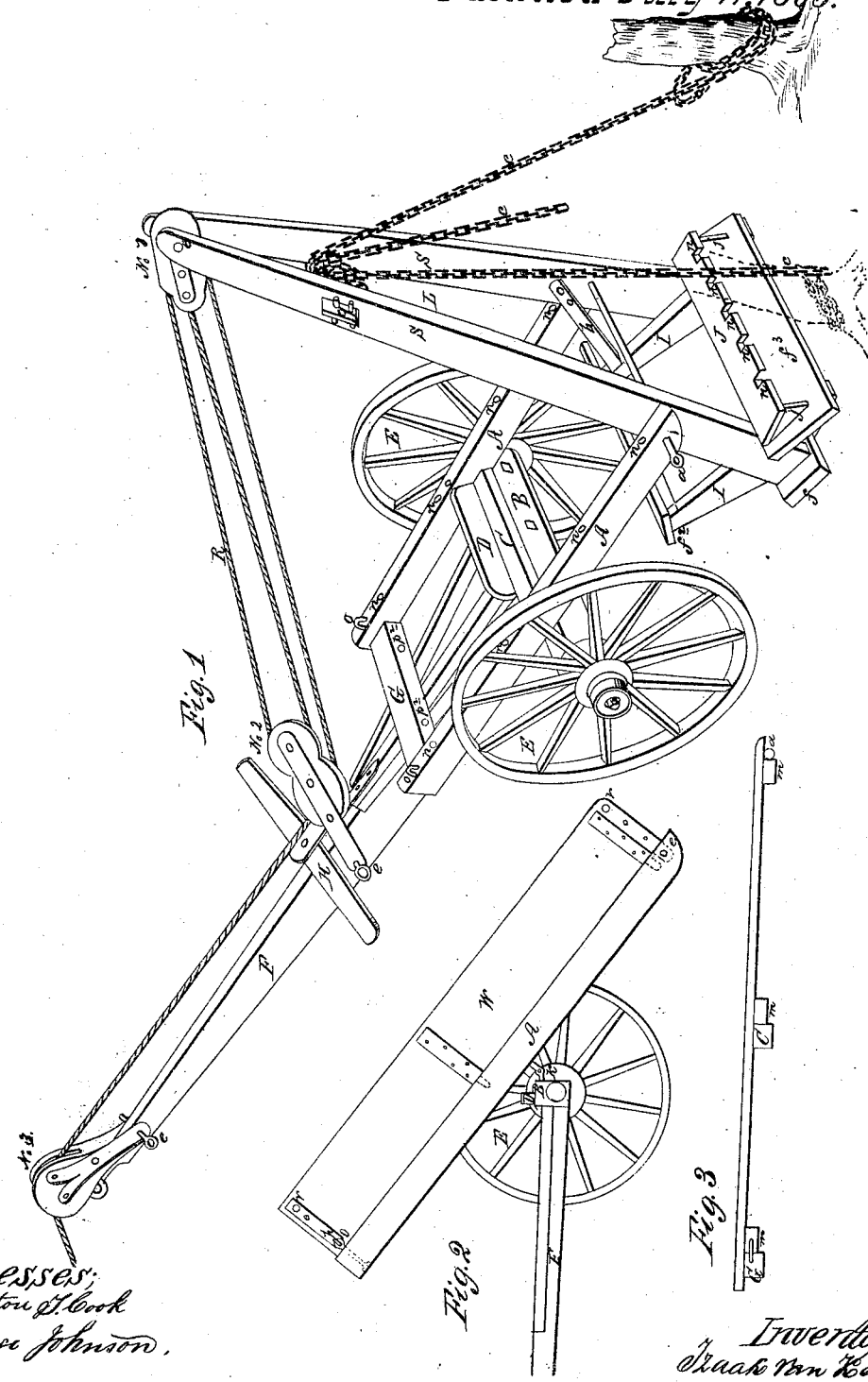
Witnesses:
Clinton F. Cook
George Johnson
Inventor:
Izaak Van Kersen

UNITED STATES PATENT OFFICE.

IZAAK VAN KERSEN, OF KALAMAZOO, MICHIGAN.

IMPROVEMENT IN STUMP AND GRUB EXTRACTORS.

Specification forming part of Letters Patent No. 48,748, dated July 11, 1865.

*To all whom it may concern:*

Be it known that I, IZAAK VAN KERSEN, in the town and county of Kalamazoo, in the State of Michigan, have invented a new and useful combination implement—viz., a tilting cart or dray convertible into a machine for pulling grubs, small stumps, and for other useful purposes on a farm; and I do hereby declare that the following is a full, clear, and exact description of the same, reference being had to the annexed drawings, making a part of this specification, in which—

Figure 1 is a perspective view of machine arranged for extracting grubs, &c. Fig. 2 is a side elevation of cart. Fig. 3 is a horizontal section in line $x$.

Similar letters refer to like parts in all of the figures.

A A represent the sides of a stout cart-frame, resting on and attached to an axle, B. There is only one girt, G, which is framed, so that when a detachable bottom rests on it said bottom will be flush on the upper side with A A. A lining-strip, C, is fastened on top of the axle in line with the girt, and a bolster, D, is fitted with stout pins or bolts on the lining-strip, so that it can be readily detached when it is required to put in the cart bottom or flooring. The wheels on which this cart-frame is mounted are seen at E E, the pole or tongue at F, and the single-tree at H.

I will now proceed to describe it when arranged for extracting stumps or grubs.

At the hind end of the cart-frame, and between the two sides A A, is inserted what I term a "strut-lever," L, which is secured by a heavy round iron rod, $a$, which passes loosely through and through. I usually construct the strut-lever of oak plank, the side pieces, S S, being just sufficiently apart at the top to admit a pulley-block between, and diverging at bottom to the width of the cart, where a foot-plank, $f$, is strongly framed on or otherwise attached.

A cross-bar, I, is lapped on and firmly secured to each side S of the lever, which cross-bar projects from the inner edge of S rather more than from the outer, and is stiffened by angle-braces $b\ b$. The inner projecting ends of the cross-bars may be tapered to lighten them, and a cross-strip, $f^2$, is secured to each brace, close to the ends of the bars. On the outer projecting portion of these cross-bars I attach a platform, (marked $f^3$,) and plate the outer edge with band-iron to resist abrasion by the chain. A box to carry an ax or other tools may be conveniently formed on this platform by fastening an angle-board, J, to end brackets, $j\ j$. The notches $n\ n$, &c., serve to pay away the slack of the chains in when not in use.

The lifting-chains $c\ c\ c$, &c., are fastened to a cross-girt, $g$, near the head of the strut-lever L, which is operated by a rope, R, rove through pulleys in pulley-blocks marked Nos. 1, 2, and 3, as follows: The end of the rope is fastened to pulley-block No. 1, and the rope passes round the upper pulley in No. 2, back to and round pulley No. 1, thence under the lower pulley in No. 2 and over pulley No. 3 at the end of the tongue, and to the horses or other draft-animals to which it is hitched.

The mode of operation is as follows: The lever L being in the position shown in Fig. 1, and the machine run up against a grub or stump, and the chain or chains attached to that and as many others as it is deemed judicious to pull at once, the draft animals, which are hitched in the ordinary way to a ring (not seen) at the loose end of the rope R, in line with the tongue, are started ahead. This pulls over the lever, which changes its fulcra successively from the outer to the inner side of the foot-plank $f'$, and thence to $f^2$, by which time the chains have obtained a bearing on the banded edge of $f^3$, and the stump or three or four grubs, whichever it may be, are torn entirely out, the lever being then nearly in a horizontal position, and the pulley-blocks Nos. 1 and 2 brought together. The horses are kept in motion until the grubs are drawn to the place of deposit, when they are unloosed from the chains, and the machine is drawn back to its work and the operation continued.

To convert the grub-machine into a dray for hauling wood or logs to mill, take off the tackles by pulling off the eyebolts $e\ e\ e$. Then pull out the long rod $a$ and remove the lever L. The flooring or bottom is made of planks secured by cleats $m\ m\ m$, which are arranged relatively with the bolster $e$ and girt G, as may be clearly seen in Fig. 3. This bottom is now lifted in its place and secured in front by slipping two stout iron pins, $p'\ p'$, driven into the forward cleat, into corresponding holes, $p^2 p^2$, made in the girt G, which keep it down to its place. The hind end is supported and the bottom prevented moving back by inserting the lever-rod $a$ in the manner indicated. Stakes being placed in the holes $n$ $n$, &c., a dray is readily produced in a few minutes' time.

I will say here that I omitted in describing the cart-frame to state that the sides A A are jointed by strong eyebolts and staples (see K) to the cart-axle to allow it to tilt, a spring-bolt securing and liberating it when necessary.

The pulleys, besides their duty in operating the lever, are very useful in loading logs on the dray. My arrangements to form a box on this dray and so convert it into a tilting-cart proper, to haul farm produce, stones, manure, &c., is as follows: After removing the stakes and the lever-rod A, I put in each side board, W, by first hooking the side hook, $h$, into the staple $o$, and then insert the cleat-pins (see dotted lines) into the corresponding holes, $n$ $n$, &c. The hind end of the side boards are secured by a projecting loop-strap, $l$, through which the rod $a$ is inserted when replaced. Cleats are nailed close to the ends of the head and tail boards, which are secured by dowel-pins in the lower edges, which are inserted in corresponding holes in the flooring, and are connected to the side boards on top by nutted rods, which pass through holes $v$ $v$ in the hook and loop-straps, and through the cleats aforesaid.

I am aware that it is no novelty to apply the multiplying power of pulleys to the long arm of a lever; but I am not aware that any lever with wide bearings arranged at and round its foot for changeable fulcrums and operated relatively, as mine is, has ever before been used for any purpose analogous to mine, for it is the peculiar arrangement of the parts composing the lever that enables me to apply it advantageously to a two-wheel cart and to pull several grubs at once by suspending from the girt $g$ any required number of separate chains. As the hind end of the cart is not rigid, the broad base of the fulcra finds always a solid bearing on the ground, however uneven it may be.

I do not claim the mode herein described of converting my cart into a dray, nor vice versa; neither do I claim any combination or adaptation of parts for any other change of legitimate use than for the extraction of stumps or grubs; but What I do claim, and desire to secure by Letters Patent, is—

The combination of the grub or stump pulling lever L and its attachments with the two-horse cart or dray, the whole being arranged, constructed, and operated substantially as and for the purposes herein specified.

IZAAK VAN KERSEN.

Witnesses:
CLINTON T. COOK,
GEORGE JOHNSON